(12) United States Patent
Wasser et al.

(10) Patent No.: US 10,533,652 B2
(45) Date of Patent: Jan. 14, 2020

(54) WORM GEAR DRIVE WITH ADJUSTABLE BACKLASH

(71) Applicant: AUMA Drives GmbH, Coswig (DE)

(72) Inventors: Tobias Wasser, Freiburg (DE); Holger Graf, Fretial (DE); Frank Rebhahn, Dresden (DE); Michael Eleser, Grossenhaim (DE)

(73) Assignee: AUMA Drives GmbH, Coswig (DE)

( * ) Notice: Subject to any disclaimer, the term of this patent is extended or adjusted under 35 U.S.C. 154(b) by 97 days.

(21) Appl. No.: 15/639,494

(22) Filed: Jun. 30, 2017

(65) Prior Publication Data
US 2018/0003285 A1 Jan. 4, 2018

(30) Foreign Application Priority Data
Jul. 4, 2016 (DE) ........................ 10 2016 008 017

(51) Int. Cl.
*F16H 57/022* (2012.01)
*F16C 19/54* (2006.01)
*F16H 1/16* (2006.01)
*F16H 57/12* (2006.01)
*F16C 19/48* (2006.01)
*F16H 57/021* (2012.01)

(52) U.S. Cl.
CPC ......... *F16H 57/022* (2013.01); *F16C 19/545* (2013.01); *F16H 1/16* (2013.01); *F16H 57/12* (2013.01); *F16C 19/48* (2013.01); *F16C 2361/61* (2013.01); *F16H 2057/0213* (2013.01); *F16H 2057/0224* (2013.01); *F16H 2057/125* (2013.01)

(58) Field of Classification Search
CPC .......... F16H 57/022; F16H 1/16; F16H 57/12; F16H 2057/125; F16H 2057/0213; F16H 2057/0224; F16C 19/545; F16C 19/48; F16C 2361/61
See application file for complete search history.

(56) References Cited

U.S. PATENT DOCUMENTS

| 3,811,335 | A | * | 5/1974 | Hunsberger | ............... F16H 1/16 74/409 |
|---|---|---|---|---|---|
| 4,261,218 | A | * | 4/1981 | Eagan, Sr. | ................ F16H 1/16 74/409 |
| 4,827,787 | A | | 5/1989 | Gillingham et al. | |
| 9,080,656 | B2 | * | 7/2015 | Wasser | ................ F16H 25/2015 |
| 9,200,700 | B2 | * | 12/2015 | Kessler | ................ F16H 57/022 |
| 2007/0295552 | A1 | | 12/2007 | Watanabe et al. | |
| 2012/0318082 | A1 | * | 12/2012 | Wasser | ................ F16H 25/2015 74/89.37 |
| 2013/0125686 | A1 | | 5/2013 | Fern et al. | |

(Continued)

FOREIGN PATENT DOCUMENTS

DE 102007019324 11/2007
GB 1044326 A * 9/1966 ................ B66F 3/18

*Primary Examiner* — Victor L MacArthur
(74) *Attorney, Agent, or Firm* — Volpe and Koenig, P.C.

(57) ABSTRACT

A worm gear drive mechanism (1) having a housing (8), a rotatably mounted worm gear (4) and a worm shaft (2) rotatably mounted at at least one bearing point (7), wherein the bearing point (7) has a displacement element (10) for displacing the axial spacing (17) between the gear axis of rotation (6) of the worm gear (4) and the shaft axis of rotation (5) of the worm shaft (2).

9 Claims, 2 Drawing Sheets

(56) References Cited

U.S. PATENT DOCUMENTS

2014/0174430 A1\* 6/2014 Fitzgerald ............... F24S 23/77
  126/578
2014/0174499 A1\* 6/2014 Fitzgerald ............... H02S 20/32
  136/246
2014/0298937 A1 10/2014 Kessler et al.

\* cited by examiner

WORM GEAR DRIVE WITH ADJUSTABLE BACKLASH

BACKGROUND

The invention describes a worm gear drive mechanism with a worm gear and a worm shaft.

It is known to use such worm gear mechanisms to displace different mechanical devices.

In particular, such worm gear mechanisms are used in solar thermal power installations to displace the mirrors which deflect the sunlight onto a heat exchanger.

In order to achieve a maximum light yield at any time, it is desirable here to achieve high precision for the adjustment of the mirrors, for which reason there is often the requirement to equip the worm gear mechanism with a small circumferential backlash.

Here, the circumferential backlash can be characterized as backlash between the tooth flanks of the worm gear mechanism.

For this purpose, it has previously been usual in the prior art to pair the worm gear and the worm shaft on the basis of the identified fabrication tolerances such that the result is a small circumferential backlash.

However, this has the disadvantage that a large number of worm gears and worm shafts have to be kept in stock in order to permit a best selection of the parts to be paired.

In order to reduce the circumferential backlash, it is likewise known in the prior art to provide specific tooth geometries for the worm shaft and/or the worm gear, for example duplex toothing. However, this is considerably more expensive in production.

SUMMARY

The object of the invention is therefore to devise a worm gear mechanism of the aforementioned type which is economical and robust and exhibits low circumferential backlash.

This object is achieved by a worm gear drive mechanism having one or more features of the invention.

The invention is, then, based on the finding that the circumferential backlash may be increased by the worm shaft being withdrawn from the toothing of the worm gear and reduced by the worm shaft dipping deeper into the toothing of the worm gear.

For this purpose, according to the invention the axial spacing between the axis of rotation of the worm gear and the axis of rotation of the worm shaft is displaceable, the worm shaft being mounted such that it is adjustably movable in the radial direction relative to the worm gear.

As a result, the circumferential backlash of the worm gear mechanism can be adjusted in a simple way. The worm shaft and the worm gear can therefore be toothed in a manner which is optimized in terms of fabrication and/or costs. Because of the adjustability of the circumferential backlash, no more pairing of parts is necessary. There is therefore no longer any necessity to stock a large number of parts.

This backlash adaptation is generally necessary only once during the assembly of the mechanism. However, as a result of wear or run-in processes, it may also be necessary to readjust the circumferential backlash. The circumferential backlash is then re-adjustable at any time with the mechanism according to the invention.

In an advantageous embodiment of the invention, the worm shaft is rotatably mounted at two bearing points, preferably on both sides of the worm. At each bearing point, there can also be an adjuster, in which the worm shaft is rotatably mounted. The adjuster can be formed cylindrically and rotatably mounted in a suitable bore in the housing. The position can then be fixed by screws or the like fixing elements.

The adjusters in an advantageous embodiment of the invention are formed as threaded rings with an eccentric bore, in which the worm shaft is rotatably mounted. The axial spacing can then be varied by rotating the adjusters.

In order to adjust the circumferential backlash in this embodiment, it is sufficient to rotate the respective threaded rings in order, with the aid of the eccentric, to arrange the worm shaft closer to the worm gear or further away from the latter, that is to say to reduce or to enlarge the axial spacing of the components.

The worm gear drive mechanism preferably has a housing, into which the threaded rings can be screwed.

In the invention, different types of mountings of the worm shaft can be used, in particular tapered roller bearings.

In a particularly space-saving embodiment of the invention, there are an axial bearing and a radial bearing at each bearing point for the rotational mounting of the worm shaft. The advantage here is a higher torsional stiffness in the output drive and therefore a higher accuracy of the achievable angle positions under higher loads on the output drive and/or the worm gear.

In an expedient embodiment, the radial bearing is then arranged in the threaded ring, and the axial bearing is located between the threaded ring and a radial projection of the worm shaft.

In order to adapt the spacing between the two axial bearings and at the same time to align the eccentric of the threaded rings, it is expedient if, at at least one bearing point, at least one shim is arranged between the threaded ring and the axial bearing. Instead of the shims, threaded rings with other dimensions, in particular of the position of the eccentricity with respect to the thread, of the length and/or of the chamfer of the thread, can likewise be used.

The bearings can be formed as desired, for example as spherical bearings. Preferably, the radial bearings and/or the axial bearings are formed as needle bearings, in particular as a needle roller cage. As a result, the mounting is particularly compact.

In order to adjust the circumferential backlash, it is expedient if the eccentricity is designed in such a way that an adjustment of the circumferential backlash to 1.5 mrad is made possible. It is in particular advantageous if the eccentricity is chosen to be so small that a rotation of the threaded ring by 180° is possible in order to adjust the circumferential backlash.

In order that the two threaded rings can be aligned in such a way that their bore axes coincide and thus skewing of the worm shaft mounting is prevented, it is advantageous if at least one marking is arranged on each of the threaded rings in a fixed position in relation to the eccentricity.

The invention also comprises a method for adjusting the circumferential backlash in a worm gear mechanism according to the invention. Here, starting from a basic setting, the following method steps are carried out repeatedly until the desired circumferential backlash is reached:

a) inspecting the circumferential backlash between a worm shaft and a worm gear,
b) adapting the circumferential backlash by varying the radial axial spacing relative to the worm gear between the axis of rotation of the worm gear and the axis of rotation of the worm shaft.

In a further embodiment of the invention, in step b) for varying the axial spacing, at least one eccentric bore, in which the worm shaft is mounted, is displaced. In this way, the eccentric bores on both sides of the worm can be aligned relative to each other, and the axial bracing of the worm mounting can be modified by shims.

Provision can then be made that, in step b) for varying the axial spacing, the two eccentric bores in which the worm shaft is preferably mounted on both sides of the worm are displaced, in particular synchronously with each other.

Overall, in step b), the circumferential backlash is enlarged by toothing of the worm shaft being moved out of toothing of the worm gear and/or the circumferential backlash is reduced by toothing of the worm shaft being moved into toothing of the worm gear.

BRIEF DESCRIPTION OF THE DRAWINGS

The invention is explained in more detail below by using a preferred exemplary embodiment and with reference to the appended drawings, in which.

DETAILED DESCRIPTION OF THE PREFERRED EMBODIMENTS

Figure 1:
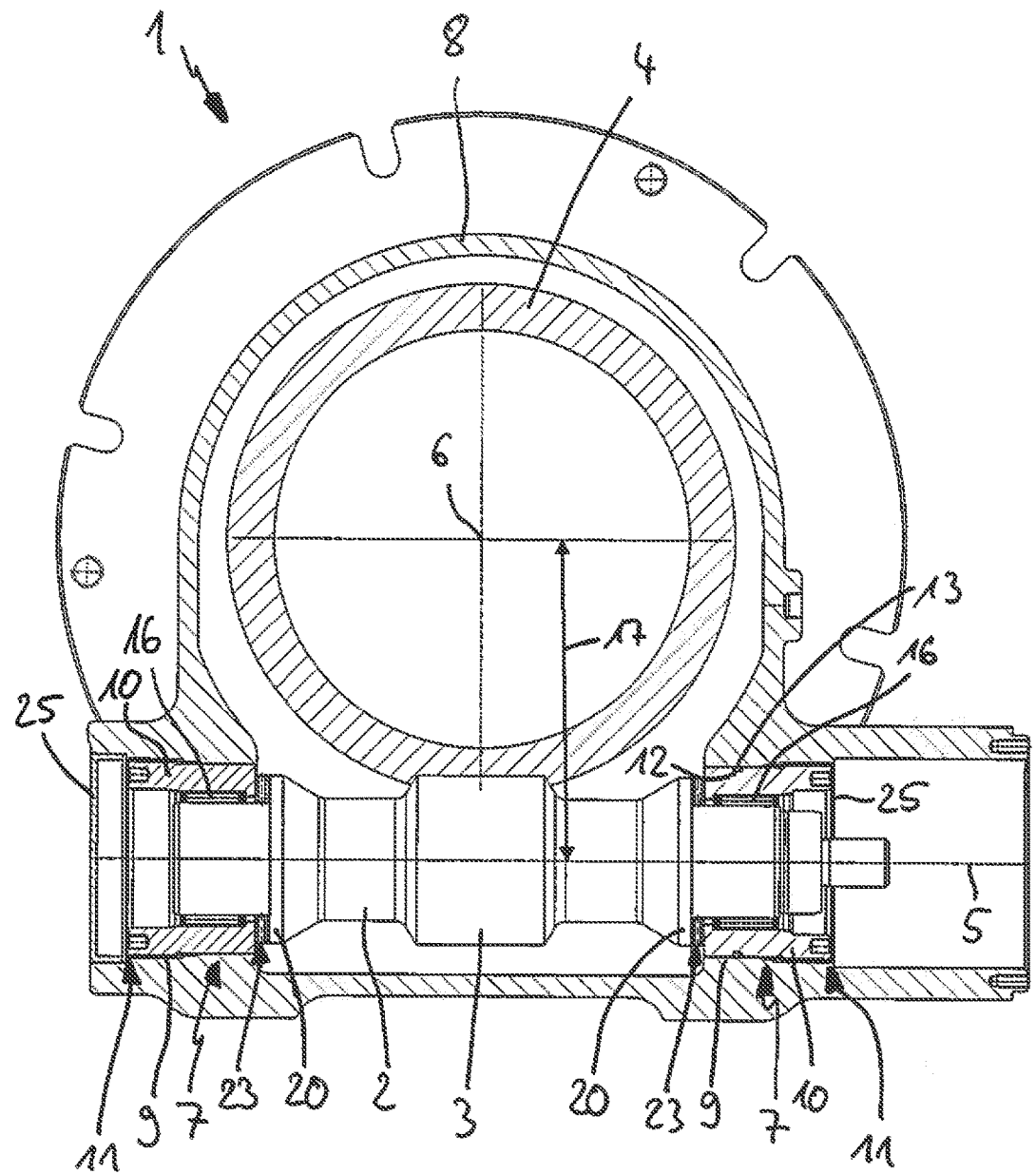
FIG. 1 shows a sectional view of a worm gear mechanism according to the invention.

In FIG. 1, a sectional view of a worm gear drive mechanism designated overall by 1 is shown. The worm gear drive mechanism 1 has a mechanism housing 8, in which there are arranged a worm shaft 2 having a worm 3 and a worm gear 4 in engagement with the worm 3. The worm shaft 2 has a shaft axis of rotation 5, which is perpendicular to the gear axis of rotation 6 of the worm gear 4. In the image, the gear axis of rotation 6 is perpendicular to the paper plane, for which reason the gear axis of rotation 6 is indicated by the intersection of the two axes of symmetry of the worm gear 4.

The worm 3 is arranged on the worm shaft 2, as a result of which it also engages with the worm gear 4.

Arranged at each of the two ends of the worm shaft 2 is a bearing point 7, at which the worm shaft 2 is rotatably mounted.

The two bearing points 7 are in principle identically designed, for which reason the following description of one bearing point 7 applies in principle to both bearing points 7.

Figure 2:
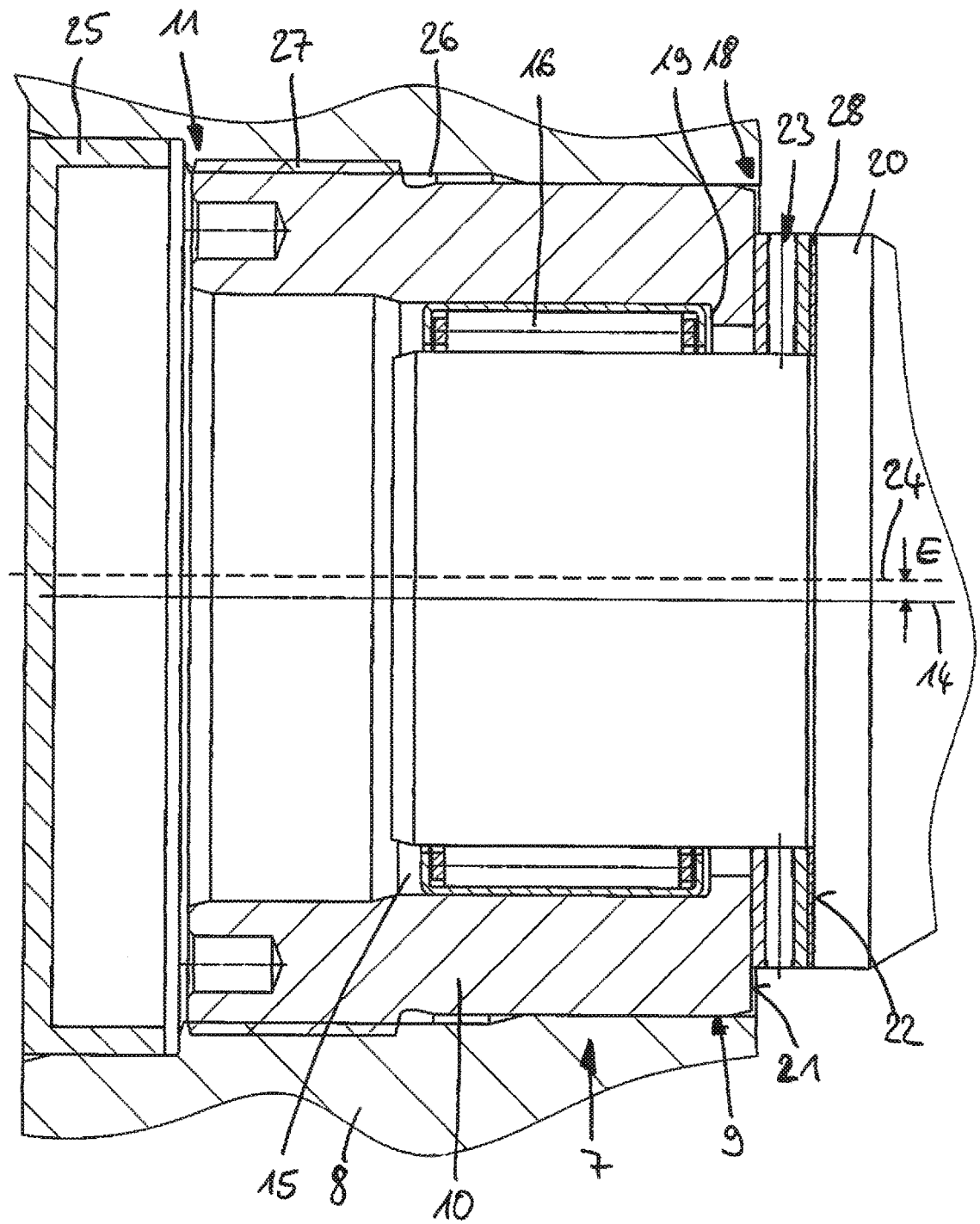
FIG. 2 shows a detailed view of FIG. 1 of a bearing point.

FIG. 2 shows a bearing point 7 in detail. At each bearing point 7, the housing 8 has a cylindrical housing opening 9 with an internal thread 26. A threaded ring 10 having an external thread 27 is screwed into said internal thread 26. In this example, the external thread 27 is arranged on the outer axial end 11 of the threaded ring 10 and covers about one third of the axial length of the threaded ring 10. In the axial section of the threaded ring 10 without an external thread 27 there is arranged a radial groove 12 on the threaded ring 10 (FIG. 1), into which an O-ring 13 or another seal is inserted in order to seal the housing 8.

The threaded ring 10 has a bore 15 offset radially by the eccentricity E in relation to the opening axis 14 of the housing opening 9. Arranged in this bore 15 is a radial bearing 16, in which the worm shaft 2 is rotatably mounted. In the example, the radial bearing 16 is a needle roller cage, by which a low overall height is achieved. However, it is also possible for any other desired rolling-contact or sliding bearing to be used.

The eccentricity E is defined as the spacing between the bore axis 14 of the housing opening 9 and the bore axis 24 of the bore 15, which coincides with the shaft axis of rotation 5. The eccentricity is preferably chosen such that a rotation of the threaded ring through 180° in order to adjust the radial backlash of 1.5 mrad is possible.

The circumferential backlash between worm 3 and worm gear 4 is adjustable by changing the axial spacing 17. The circumferential backlash between worm 3 and worm gear 4 can thus be varied, according to the invention, by changing the axial spacing 17 between the gear axis of rotation 6 of the worm gear 4 and the shaft axis of rotation 5 of the worm shaft 2.

In the embodiment shown, said axial spacing 17 can be changed by the threaded ring 10 being rotated. The eccentric bore 15 in which the worm shaft 2 is mounted then effects a change in the axial spacing 17.

In the bore 15, at the inner axial end 18, the threaded ring 10 has a radially inwardly projecting rim 19, on which the radial bearing 16 is arranged axially but does not touch the shaft 2.

The worm shaft 2 has a radial step 20, which is located opposite the inner end face 21 of the threaded ring 10 and serves as a contact face 22 for the contact of the axial bearing washer. An axial bearing 23 is arranged between this contact face 22 and the end face 21. In the example, this axial bearing 23 is also formed as a needle bearing, in order to permit the most compact structure possible. The axial bearing 23 here comprises two thrust washers and a needle roller cage. Of course, the axial bearing can also be any desired rolling-contact or sliding bearing.

The two axial bearings 23 are braced against the contact faces 22 by the threaded rings 10. The two threaded rings 10 must be aligned exactly relative to each other such that the respective bore axes 24 are in alignment.

As shown in FIG. 2, at one or both bearing points 7 between the contact face 22 and the axial bearing 23 and/or between the axial bearing 23 and the end face 21 of the threaded ring 10, a shim 28 can be inserted in order to adapt the axial bracing of the worm shaft. If necessary, multiple shims 28 can also be used. In order to assist the accurate alignment of the two threaded rings 10, a marking in relation to the eccentricity can be arranged on each of the threaded rings 10.

At both bearing points 7, the openings 9 are covered by covers 25 or suitable seals, by which the penetration of dirt and/or water and/or the emergence of lubricants is prevented.

The invention provides a worm gear drive mechanism 1 having a housing 8, a rotatably mounted worm gear 4 and a worm shaft 2 rotatably mounted at at least one bearing point 7, wherein the bearing point 7 has a displacement element for displacing the axial spacing 17 between the gear axis of rotation 5 of the worm gear 4 and the shaft axis of rotation 5 of the worm shaft 2.

In a worm gear drive mechanism 1 according to the invention, in order to adjust the circumferential backlash between worm 3 and worm gear 4, the following method can be carried out. The worm gear mechanism 1 is firstly completely assembled. Care must be taken that the two threaded rings 10 are aligned exactly such that their bore axes 24 are identical.

Following the assembly, the circumferential backlash between worm 3 and worm gear 4 is determined. Several methods, which will not be discussed in more detail here, are known for this purpose.

If the current circumferential backlash does not correspond to the desired target circumferential backlash, then the two threaded rings 10 are rotated synchronously. As a result of the eccentric position of the worm shaft 2 within the bore 15 in the threaded ring 10, the axial spacing 17 between shaft axis of rotation 5 and gear axis of rotation 6 changes as a result. Depending on the direction of rotation, the axial spacing 17 between the worm 3 in the worm gear 4 becomes larger or smaller as a result. With a larger axial spacing, the circumferential backlash is larger, and with a small axial spacing the circumferential backlash is smaller.

Following the adjustment, the circumferential backlash is measured again and possibly re-adjusted. This method is repeated until the desired circumferential backlash is reached.

A worm gear drive mechanism 1 having a housing 8, a rotatably mounted worm gear 4 and a worm shaft 2 rotatably mounted at at least one bearing point 7, wherein the bearing point 7 has a displacement element 10 for displacing the axial spacing 17 between the gear axis of rotation 6 of the worm gear 4 and the shaft axis of rotation 5 of the worm shaft 2.

LIST OF DESIGNATIONS

1 Worm gear drive mechanism
2 Worm shaft
3 Worm
4 Worm gear
5 Shaft axis of rotation
6 Gear axis of rotation
7 Bearing point
8 Bearing housing
9 Housing opening
10 Threaded ring
11 Outer axial end of the threaded ring
12 Groove
13 O ring
14 Bore axis
15 Eccentric bore
16 Radial bearing
17 Axial spacing
18 Inner axial end of the threaded ring
19 Rim
20 Radial projection
21 End face
22 Contact face
23 Axial bearing
24 Bore axis
25 Covers
26 Internal thread
27 External thread
28 Shim
E Eccentricity

The invention claimed is:

1. A worm gear drive mechanism (1) comprising a worm gear (4) and a worm shaft (2), an adjustable mount configured to adjust an axial spacing (17) between a gear axis of rotation (6) of the worm gear (4) and a shaft axis of rotation (5) of the worm shaft (2) by allowing movement of the worm shaft (2) in a radial direction relative to the worm gear (4), the adjustable mount includes two bearing points (7), one of said bearing points being located on each side of a worm (3) of the worm shaft (2) each having an axial bearing (23) and a rotatable adjuster, each of the rotatable adjusters comprises a threaded ring (10) having an eccentric bore (15), in which the worm shaft (2) is rotatably mounted, and at least one shim (28) arranged at least at one of the bearing points (7) between the threaded ring (10) and the axial bearing (23) and is configured to provide for synchronized eccentricities of the threaded rings (10) at the bearing points.

2. The worm gear drive mechanism (1) as claimed in claim 1, further comprising a housing (8) with threaded cylindrical openings (9) at the bearing points (7), into which the threaded rings (10) are screwed.

3. The worm gear drive mechanism (1) as claimed in claim 2, further comprising a radial bearing (16) in the eccentric bore (15) at each said bearing point (7) for rotational mounting of the worm shaft (2).

4. The worm gear drive mechanism (1) as claimed in claim 3, wherein the axial and radial bearings (16, 23) are formed as needle bearings.

5. The worm gear drive mechanism (1) as claimed in claim 2, wherein at least one marking is arranged on each of the threaded rings (10) in a fixed position in relation to the eccentricity.

6. A method for adjusting a circumferential backlash in a worm gear drive mechanism (1), comprising:
    providing the worm gear drive mechanism (1) as claimed in claim 1;
    starting from a basic setting, repeatedly carrying out the following steps until a desired circumferential backlash is reached:
    a) inspecting the circumferential backlash between the worm shaft (2) and the worm gear (4),
    b) adapting the circumferential backlash by varying the axial spacing (17) between the gear axis of rotation (6) of the worm gear (4) and the shaft axis of rotation (5) of the worm shaft (2) by synchronously displacing the two eccentric bores (15) in the threaded rings (10) located at the two bearing points (7), in which the worm shaft (2) is mounted that are located on both sides of the worm (3) located on the worm shaft (2), and arranging the at least one shim (28) at least at one of the bearing points (7) between the threaded ring (10) and the axial bearing (23) located at the bearing point.

7. The method as claimed in claim 6, further comprising, in step b) for varying the axial spacing (17), displacing at least one of the eccentric bores (15) in a threaded ring in which the worm shaft (2) is mounted.

8. The method as claimed in claim 6, wherein, in step b), the threaded rings on both sides of the worm (3) of the worm shaft (2) are displaced synchronously.

9. The method as claimed in claim 6, further comprising, in step b), at least one of enlarging the circumferential backlash by toothing of the worm shaft (2) being moved out of toothing of the worm gear (4) or reducing the circumferential backlash by the toothing of the worm shaft (2) being moved into the toothing of the worm gear.

* * * * *